Patented Aug. 5, 1947

2,425,086

UNITED STATES PATENT OFFICE 2,425,086

METHOD OF PREPARING MOLECULARLY ORIENTED COPOLYMERS OF ACRYLONITRILE, BUTADIENE 1,3 AND A VINYL ETHER

Gaetano F. D'Alelio, Northampton, Mass., assignor to Pro-phy-lac-tic Brush Company, Northampton, Mass., a corporation of Delaware No Drawing. Application February 25, 1944, Serial No. 523,901

6 Claims. (Cl. 18—54)

The present invention relates to a synthetic material having many of the qualities of natural rubber and capable of being made into a variety of objects, particularly, filaments, monofils and sheets, the base of the material being, in general terms, a copolymer including a butadiene-1,3 and an acrylonitrile, which in the completed article has its physical properties improved by molecular orientation, so that it exhibits characteristic crystalline X-ray diffraction patterns. The invention further is based primarily on the discovery that copolymers of the type in question may be converted into gels by being mixed with certain liquids of which nitro hydrocarbons are examples, and that such gels of the proper consistency can be cold drawn to improve the physical properties by molecular orientation and further that it is possible to render such copolymers vulcanizable by introducing vulcanizing agents during the formation of the gel, thus overcoming the difficulties previously experienced with such mixtures owing to the internal heat developed when copolymers not in gel form are subjected to mechanical working. Accordingly, the invention includes the process or method of producing the articles in question, the novel gel and the new articles, which are produced by the process.

The copolymer employed results from the copolymerization of a mixture comprising an acrylonitrile as the major polymerizable component and a butadiene-1,3 wherein the acrylonitrile has a formula.

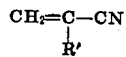

and the butadiene-1,3 has the formula

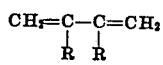

where R and R' are selected from the class of hydrogen and a methyl radical, the acrylonitrile being at least 40% and the butadiene being at least 10% of the copolymer.

Acrylonitrile itself, when polymerized, has a high softening point and is extremely resistant to the solvent actions of many chemical bodies. Polyacrylonitrile is too hard and brittle and has too high a softening point to be used in the preparation of extruded or precipitated bodies which are to be treated to orient the molecules.

I have now discovered a process of cold drawing certain acrylonitrile-butadiene-1,3 copolymers. These results are extraordinary and unpredictable since it had not been demonstrated that either polyacrylonitrile or the unmodified butadiene polymers themselves are capable of responding to such a process. Heretofore, this had not been considered possible, probably because of the extreme difficulty in processing acrylonitrile-butadiene compositions. For example, it is extremely difficult to process an interpolymer of fifty parts of acrylonitrile and butadiene because of the high temperatures required and the resulting oxidation and embrittlement of the product. The excess internal frictional resistance encountered in the processing causes a high internal heat build-up and the mass becomes unworkable because of further polymerization which occurs through the residual diene double bonds, and through the triple bond of the nitrile group of the acrylonitrile residue in the polymer.

Even acrylonitrile-butadiene polymerizates containing less acrylonitrile than before mentioned, that is of the order of 35 to 40% acrylonitrile, are so insoluble that solutions satisfactory for use cannot be prepared. This insolubility has precluded their use in the preparation of oriented films and fibers from solutions.

Furthermore, while it is recognized that the copolymers in question are vulcanizable, it has not been found practical to vulcanize them because when it is attempted to mix them with a vulcanizing agent the necessary working of the mass produces so much heat that the mass vulcanizes on the rolls or in the mixer.

I have now discovered a process by which certain polymerization products of a mixture including acrylonitrile and a butadiene-1,3, may be cold drawn and by which vulcanizing agents can be incorporated in them so that vulcanized final products may be produced.

My invention makes possible production of molecularly oriented structures, such as fibers, monofils, sheet materials, rods and other objects from an acrylonitrile-butadiene polymerizate wherein the acrylonitrile component comprises from about 45 to 80% of the interpolymer and the butadiene at least 10%. It also makes possible the production of vulcanized objects from such polymerizates.

The invention is based on the discovery that it is possible to convert interpolymers of the kind described into workable cohesive gels by the addition of certain liquids which, while they are not in general solvents for the interpolymers, have the power of swelling these interpolymers and forming gels therefrom. Such liquids are dissolved in the interpolymer but do not dissolve it. During the formation of the gel vulcanizing agents may be introduced and distributed through the mass. Thereafter, the gel may be made into a predetermined shape and there subjected to cold drawing to improve the physical properties of the final article by producing molecular orientation parallel to the surface. Therefore, the material is not necessarily subjected to excessive heat nor is heat generated internally sufficient either to cause unwanted further polymerization or premature vulcanization from vulcanizing agents which may be present in the mass.

The copolymers which may be employed include copolymers of an acrylonitrile and a butadiene-1,3, the acrylonitrile being in the amount from 45 to 80% and the butadiene not less than 10% if a cold drawn product is to be made. But it will be understood that a third component such as maleates or vinyl ethers or polymerizable esters containing a $CH_2\!=\!C\!<$ grouping may be included in the copolymer, such as tripolymers being described in my copending applications Serial No. 523,898 filed February 25, 1944, and Serial No. 523,900 filed February 25, 1944. In these copending applications various examples of vinyl ethers and esters of maleic acid have been given. The vinyl ether is illustrated by the formula

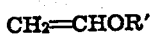

$$CH_2\!=\!CHOR'$$

and the esters of maleic acid are represented by the formula

$$R'OOCCH\!=\!CHCOOR'$$

where R' is selected from the group consisting of alkyl, aryl, aralkyl and alkaryl radicals.

After the copolymer has been formed, it is mixed with sufficient liquid to form a gel, which is strong and tough so that objects formed therefrom are capable of being cold worked. Among suitable hydrocarbon solvents for mixing with the copolymers to form the gel may be mentioned the nitro-aliphatics, such as, nitromethane, nitroethane, nitropropane, nitrobutane, the nitro-aromatics and the nitro-cyclo-aliphatics. Also, there may be used in connection with them, but preferably in minor proportions, certain ketones, for instance, acetone, methyl ethyl ketone, methyl propyl ketone, methyl amyl ketone, acetophenone, phorone, methyl chlorphenyl ketone, methyl nitrophenyl ketone, chlor-ethyl, nitrophenyl ketone, diacetone alcohol, acetonyl acetone, acetyl acetone, biacetyl, methyl acetoacetic ester, ethyl acetoacetic ester, etc.; the nitro-alcohols such as 2-nitro-1-ethanol, 2-nitro-1-propanol, 2-nitro-1-butanol, 2-nitro-1-pentanol, etc.; esters of the aforementioned nitro-alcohols, such as, the formate, the acetate, the propionate, the butyrate, etc.; the ethers of the aforementioned nitro-alcohols, for example, the methyl, the ethyl, the propyl, and the butyl ethers, etc.; the cyano-alcohols, for example, lactonitrile, the addition products of the lower-boiling aldehydes and ketones with hydrogen cyanide, for example, the reaction products of hydrogen cyanide with acetaldehyde, propionaldehyde, acetone, methyl ethyl ketone, etc.; the esters of the cyano-alcohols, for example, the formate, the acetate, the propionate, etc.; the ethers of the cyano-alcohols, for example, the methyl, ethyl, propyl, etc., ethers. Certain phosphates such as trimethyl and triethyl phosphates may likewise be used.

For certain compositions, if it is desirable, such gelation solvents as pyridine, quinoline, acetic anhydride, acetic acid, etc., may be used, but they are undesirable from a health and safety factor or from the corrosion factor encountered in the manufacturing process. The foregoing gelation agents are mentioned by way of illustration and not as limitations, except where limitations are found in the claims appended hereto, since I believe myself to be the first to discover the possibility of making a gel from the materials in question and the process of utilizing the gel. It may be desirable to introduce a certain amount of plasticizing material in these copolymers and it is desirable that such plasticizers be introduced into the polymer mass after the gelation of the mass has been accomplished by the gelation solvents.

By this method, many plasticizers which normally do not possess good compatibility with the polymer may be incorporated into the polymer. Suitable high-boiling plasticizers may be mentioned, the polybasic esters of cyanoethyl alcohol, such as, the esters of phthalic, succinic, sebacic, tetrahydrophthalic, endomethylene tetrahydrophthalic, acetyl citric acids, etc. It is not necessary that all of the carboxyl groups of the polybasic acid be esterified with the cyano-alcohol. Thus, in a dicarboxylic acid, one carboxyl group may be esterified with the cyano-alcohol, and the other with the methyl, ethyl, propyl, butyl alcohols, etc.; and in a tricarboxylic acid, it is sufficient if one or two of the carboxyl groups are esterified with the cyano-alcohol, and the residual carboxyl groups esterified with another alcohol. Also, as suitable plasticizers for the products of this invention may be mentioned the condensation products of acrylonitrile with organic compounds containing active hydrogen such as, for example, the condensation product of an acrylonitrile and acetone wherein the hydrogens of the —CH₃ groups of the acetone may be substituted by from one to six beta-cyanoethyl groupings. Other plasticizers which may be prepared by the condensation of acrylonitrile with organic compounds containing active hydrogen are the condensation products with alcohols, for example, with phenyl ethyl alcohol, phenoxyethyl alcohol, methoxy diethylene glycol, ethoxy diethylene glycol, phenoxy diethylene glycol, etc., condensation products of acrylonitrile with such compounds as the acetoacetic esters, malonic esters, acetyl acetone, and certain polycyclic hydrocarbons, containing active

$$-\overset{|}{C}H_2$$

groupings, the condensation products of acrylonitrile with cyano and nitro-alcohols, etc.

As a typical example for the preparation of the interpolymer suitable for use in the practice of this invention, the following example is given:

| | Parts |
|---|---:|
| Acrylonitrile | 1020 |
| Butadiene | 680 |
| Distilled water | 3500 |
| Sodium oleate | 87 |
| Potassium persulfate (or sodium perborate) | 4 to 9 |
| Ferric citrate (or phosphate) | 3 to 8 |
| Dodecyl mercaptan | 2 to 5 |

The above components are introduced into a pressure reactor, equipped with high-speed agitation, thermostatic control, etc., and reacted at 50° to 55° C. from four to nine hours depending on the concentrations of the catalyst, the initiator, the activator, etc. The reaction is continued until at least 90% of the monomers are converted to the polymeric state.

At the completion of the reaction, 10 to 35 parts of N-phenyl beta-naphthyl amine are added, after which the unreacted monomers, if any, are stripped from the reaction mass. Precipitation is accomplished by use of an equal volume of aqueous 3% sodium chloride: 3% sulfuric acid mixture, and washed with water to remove traces of sulfate and chloride ions.

The product is then carried to dryness in a vacuum oven and at 50° to 100° C. at 15 to 25 inches of mercury. The granular, somewhat resilient product is not soluble in numerous solvents such as in benzene, toluene, glycol, glycerin, water, acetone, acetic acid, acetic anhydride, methyl ethyl ketone, methanol, ethanol, chloroform, dioxane, nitrobenzene, nitromethane, nitroethane, ethylene dichloride, etc. When the copolymer is left in contact with certain solvents such as nitromethane, considerable swelling occurs but solution of the polymeric mass is not effected. In this case, the polymer is not soluble in the nitromethane, but the nitromethane is sufficiently soluble in the polymer to produce a gel.

The copolymer is processed with difficulty because of its tough, knurly nature. Should ordinary milling procedures be used, considerable internal and frictional heat-build-up occurs, so that vulcanization begins immediately on the rolls and cannot sufficiently be controlled, even by cooling the mill.

By the practice of this invention, however, the copolymer is introduced into masticating equipment such as a Banbury, dough mixer, rubber or plastic mills, together with an amount of gelation solvent, e. g., a nitrohydrocarbon, sufficient to form a cohesive gel, and can be worked with no undue rise in temperature and with relative ease.

When produced in this form, the copolymer can be given any desirable shape, such as by extrusion or calendering, and then (1) the gelation solvent removed by suitable means and the formed article cold drawn or (2) part of the gelation solvent is removed and the polymer cold drawn and the remainder of the solvent removed, or (3) none of the gelation solvent may be removed prior to cold drawing. The latter method, however, is not the preferred method since these gels are usually weak in their structural properties. The preferred method comprises eliminating some, or a substantial part, of the gelation solvent prior to cold drawing.

The cold drawing may be accomplished at any suitable temperature from room temperature or slightly below up to temperatures of the order of 70 to 100° C. The extent of the cold drawing depends on the composition of the mass and, in general, cold drawing of the order of 100 to 600% may be accomplished.

The physical nature of the copolymer, when converted to a gel structure, permits the ready introduction of the vulcanizing ingredients without the loss of its processability. In this way, I am able to produce a cold-drawn vulcanized composition by forming a readily workable plastic mass by the means of a gelation solvent, introducing vulcanizing ingredients, readily forming the article desired, eliminating some or a substantial part of the solvent, cold drawing the form, and vulcanizing the cold-drawn form.

As is well known in the art, the process of cold drawing markedly increases the tensile strength of the polymer. Such cold-drawn polymers, such as are derived from vinyl and vinylidene compounds having a $CH_2=C<$ grouping are thermoplastic in nature and have low elasticity, unless highly plasticized. Usually they relax to the undrawn form when subjected to temperatures of the order of 65° to 90° C. The practice of my invention overcomes many of the objections encountered in the oriented fibers and films of such thermoplastic polymers. A further advantage accrues to the practice of my invention as is evident from the variety of compositions that may be prepared over the range of compositions of nitrile and the diene used in the practice of this invention.

Thus, the copolymer of 60 parts of acrylonitrile and 40 parts of butadiene, when prepared, is a rigid, not too flexible mass, but when processed in accordance with the practice of my invention is extremely flexible. Furthermore, when compounded for vulcanization, such as with two parts of benzothiazyl-disulfide, two parts of sulfur, and one part of stearic acid per 100 parts of polymer, and cold drawn after elimination of the nitromethane, which was used as a gelation solvent, and cured, produced oriented sheet material which was extremely flexible and readily draped even at thicknesses of 0.030 inch. A corresponding acrylonitrile-ethyl acrylate film is considerably more rigid and firm.

The increase in tensile strength and flexibility after the cold drawing process is remarkable, and it is during the cold drawing process that molecular orientation along the major axis takes place. The extruded or otherwise formed articles are not in themselves molecularly oriented until they are cold drawn. It is only after the cold-drawing process that they exhibit the characteristic X-ray diffraction patterns indicative of orientation. A further surprising element of these copolymers is that they may be partially vulcanized, and in this partially vulcanized state they are still capable of being cold drawn. In fiber form, the vulcanized, oriented copolymer showed elongations from 100 to 300%.

The use of carbon black results in a definite reinforcement of the copolymer even when the butadiene component is in the minor proportion. Other reinforcing agents which may be used are zinc oxide, barium sulphate, walnut shell flour, the iron oxides, and ligno-cellulose. When bodies with reduced elasticity are desired, this is readily accomplished by increasing the nitrile content with a corresponding decrease in elasticity. This may also be accomplished by decreasing the butadiene content with a corresponding increase in the nitrile content, or by the introduction of at least one other of the polymerizable ethylenic compounds mentioned heretofore. Thus by increasing the acrylonitrile content to 70% and using therewith 30% butadiene, there is produced an oriented vulcanizable or vulcanized material of higher tensile strength and lower elongation. The elongation may further be reduced by replacing 20 parts of the butadiene by other monomers such as vinyl ether, diethyl maleate, etc.

The products of this invention vary in tensile strength from 2,000 to 30,000 or 40,000 pounds per square inch, depending upon the composition, method of preparation, modifying ingredients, the temperature of cold drawing, ingredients used in vulcanization, etc. In general, the compositions containing the higher quantities of acrylonitrile possess the greater tensile strength and lower elongations than the compositions containing a reduced quantity of acrylonitrile.

Other compositions suitable for the practice of this invention are the polymerization products of the following mixtures:

| Parts Acrylonitrile | Parts Butadiene | Parts Other Monomers |
|---|---|---|
| 80 | 10 | 10 vinyl ether |
| 75 | 10 | 25 vinyl ether |
| 70 | 25 | 5 vinyl ether |
| 70 | 20 | 10 vinyl ether |
| 70 | 15 | 15 vinyl ether |
| 70 | 10 | 20 vinyl ether |
| 60 | 35 | 5 diethyl maleate |

The following will illustrate the practice of the invention.

A copolymer of 60 parts of acrylonitrile and 40 parts of butadiene 1,3 was made as described in my copending application, Serial No. 523,898, filed February 25, 1944. 30 grams of this copolymer were mixed with 10 grams of nitromethane on rolls. The result was a tough, cohesive, workable gel. This gel was then formed into a rough sheet which, when stretched, showed the characteristic X-ray diffraction pattern. A piece of this material was then heated at 100° C. until all but 1 or 2% of the nitromethane was driven off. It was still possible to cold-draw the material. Another piece of the material was mixed with vulcanizing agents as follows:

100 parts copolymer
1 to 2 parts sulphur
1 part benzothiazyldisulfide or mercaptobenzothiazole
½ of 1 part zinc oxide
½ of 1 part stearic acid.

A piece of this material was stretched 300% and then placed in an oven at 130° C. for ½ hour to vulcanize it.

Another piece of the same material was put in an oven at 100° C. to drive off the nitromethane. It was then cold-drawn and placed in an oven at 180° C. After 20 minutes, the piece was removed and it could still be cold-drawn showing that vulcanization was not complete. After being in the oven 40 minutes, it could no longer be cold-drawn.

Another piece of the material was mixed with 25 parts of carbon black (channel black) to 100 parts of copolymer. It was sheeted and the nitromethane driven off by heating. The sheet was then stretched 20 or 30%, placed between hot platens and molded at 140° C. for ½ hour. The resulting sheet was not hard or stiff, as would have been the case if rubber had been employed, but was very flexible, soft and limp. A portion of the sheet was stretched 600% and recovered about 500% in one minute.

Fibers and similar articles produced according to this invention may be woven into highly insoluble and chemical resistant cloth for use in filter cloths and handling chemicals and the like. They may also be used for textiles, for example, cloth, hosiery, articles of clothing, etc. In the form of sheets, they may be used as protective coatings, awnings, rain coats, shower curtains, aprons, hospital bed sheeting, containers for hydrocarbon oils, gasoline, kerosene, petrolatum, ointments, etc.

These compositions likewise may be produced in the form of monofils having high tensile strengths and elasticity with elongations varying from 10 to 20 to 600%.

I claim:

1. A composition suitable for use in producing articles of desired shape comprising a liquid nitrohydrocarbon and the polymerization product of a mixture consisting of 10 to 25 parts butadiene 1, 3, 70 to 80 parts acrylonitrile, and 5 to 25 parts of vinyl ether, said composition being a workable cohesive gell.

2. A composition according to claim 1 including a vulcanizing agent.

3. A cold drawn article, such as a sheet, fibre or the like which exhibits a characteristic crystalline X-ray diffraction pattern comprising a polymerization product of a mixture consisting of 10 to 25 parts butadiene 1,3, 70 to 80 parts acrylonitrile, and 5 to 25 parts of vinyl ether.

4. A cold drawn article, such as a sheet, fibre or the like according to claim 3 in which there is included a vulcanizing agent.

5. The process of preparing shaped articles of the polymerization product of a mixture consisting of 10 to 25 parts butadiene 1,3, 70 to 80 parts acrylonitrile, and 5 to 25 parts of vinyl ether, which comprises forming a workable cohesive gell by mixing a liquid nitrohydrocarbon and said polymerization product, and forming an article of the desired shape of said gell.

6. The process according to claim 5 wherein a vulcanizing agent is mixed with the polymerization product.

GAETANO F. D'ALELIO.

REFERENCES CITED

The following references are of record in the file of this patent:

UNITED STATES PATENTS

| Number | Name | Date |
|---|---|---|
| 1,973,000 | Konrad et al. | Sept. 11, 1934 |
| 2,325,984 | Sarbach | Aug. 3, 1943 |
| 2,245,310 | Waterman et al. | June 10, 1941 |
| 1,929,453 | Semon | Oct. 10, 1943 |
| 2,367,493 | Fordyce et al. | Jan. 16, 1945 |
| 2,360,867 | Garvey | Oct. 24, 1944 |

FOREIGN PATENTS

| Number | Country | Date |
|---|---|---|
| 387,976 | Great Britain | Feb. 16, 1943 |

OTHER REFERENCES

Paint, Oil and Chemical Review, Oct. 8, 1942, pages 8 to 10, 25 to 29.

India Rubber World, Oct. 1942, pages 33, 34, 38.